June 19, 1934.  H. F. VICKERS  1,963,428
ROTARY COMPRESSOR
Filed Feb. 25, 1929
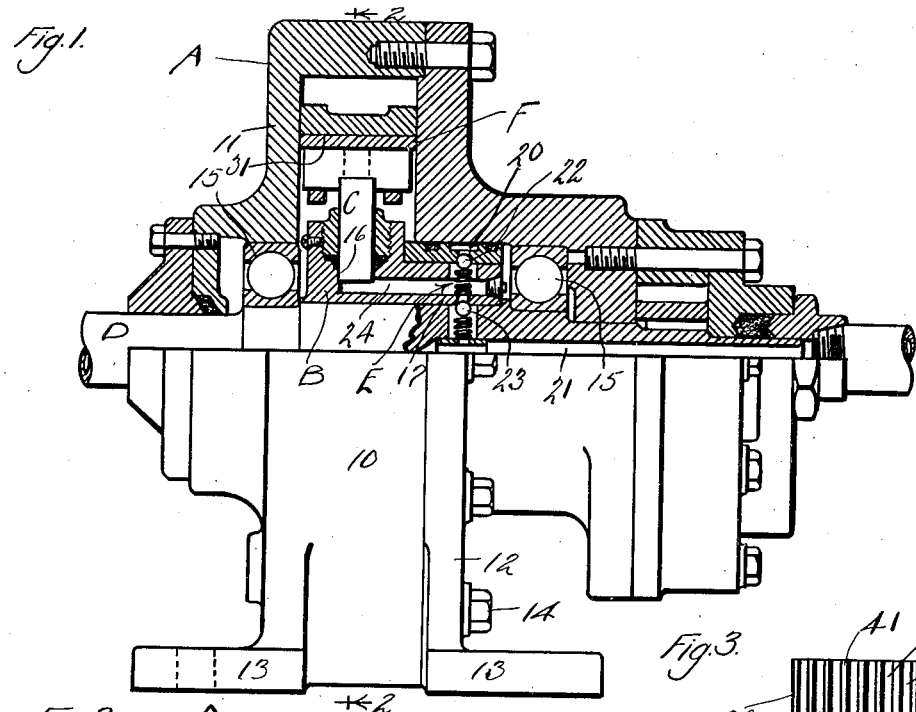
Inventor
Harry F. Vickers
by
his Attorney Patented June 19, 1934

1,963,428

UNITED STATES PATENT OFFICE 1,963,428

ROTARY COMPRESSOR

Harry F. Vickers, Los Angeles, Calif.

Application February 25, 1929, Serial No. 342,604

3 Claims. (Cl. 287—97)

This invention relates to a construction for the sliding parts of a rotary mechanism such as a rotary engine, compressor, or the like, and it is a general object of the invention to provide a construction which minimizes friction in a mechanism of this character.

The present invention is concerned with a construction for a mechanism wherein there is a fluid handling means of the reciprocating type in which the reciprocation is caused by the cooperation of a bearing shoe and an eccentric, or the like. Mechanisms of the type mentioned, as heretofore constructed, operate successfully within certain limits, however, under high fluid pressures the bearing pressures on the eccentric, that is between the sliding parts, become excessive making the machines very inefficient.

It is a general object of the present invention to provide an improved arrangement and formation of the sliding parts in a mechanism of the character above mentioned. By the present invention the sliding parts of the mechanism, that is the eccentric bearing member and the shoes or slippers which act on such member, are related so that an oil wedge or film forms between them, making friction negligible.

Another object of the invention is to provide an arrangement and relationing of parts, particularly a mounting of the sliding shoe or slipper on the reciprocating part whereby the slipper allows an oil film to form under it.

A further object of the invention is to provide a construction for the shoe or slipper of a mechanism of the character mentioned which causes oil to feed or wedge between the shoe and the part on which it slides.

The various objects and features of the invention will be best and more fully understood from the following detailed description of a typical form and application of the invention, throughout which description reference is had to the accompanying drawing, in which:

Fig. 1 is a side elevation of the mechanism embodying the invention showing the upper half of the mechanism in section. Fig. 2 is a detailed transverse sectional view of the mechanism being a view taken as indicated by line 2—2 on Fig. 1. Fig. 3 is a detailed view showing the bearing face of one of the shoes being a view taken as indicated by line 3—3 on Fig. 2, and Fig. 4 is a detailed transverse sectional view taken as indicated by line 4—4 on Fig. 2.

The present invention is concerned, generally, with a rotary mechanism having fluid handling means of the reciprocating type, that is a fluid handling means wherein two parts, such as a cylinder and piston or a cylinder and plunger, operate relative to each other. In the mechanism to which the present invention is applicable the relative movement between the fluid handling parts is caused by rotation, for instance, by rotation of the fluid handling means relative to an operating part or eccentric. The present invention is particularly concerned with the bearing engagement between the part to be reciprocated and the eccentric that causes the reciprocation. The invention is not specifically concerned with the general arrangement or details of the mechanism nor with the specific nature of the part that is reciprocated. For example, the invention can be used in arrangements wherein the cylinder is moved or reciprocated relative to the piston or plunger, or wherein the plunger or piston is reciprocated with reference to the cylinder. Further, the present invention is in no way concerned with the details of the valve arrangements or other such means that may be incidental to the mechanism.

In the following detailed description I will refer to an arrangement wherein there is an adjustable eccentric for causing reciprocation of the fluid handling parts and wherein the cylinders of the mechanism are carried in a block which revolves about a fixed axis, while the plungers, or parts coacting with the cylinders, are carried around with the cylinder block and reciprocate in the cylinders or relative to the axis about which the cylinder block rotates. It is to be understood that the details herein set forth are not to be construed as limiting the broader principles of the present invention, but are merely given to facilitate and understanding of the invention.

The mechanism illustrated in the drawing as typical of the general type of mechanism in which the present invention may be used, includes, generally, a casing or housing A, a cylinder block B rotatably mounted in the housing, plungers C carried in the cylinders of the block B, a shaft D extending into the housing and carrying the block, valve means E for controlling flow of fluid to and from the cylinders, and various other parts as will appear from the drawing and from the following description.

The present invention is concerned primarily with the means provided for causing reciprocation of the plungers C in the cylinders of the block B upon the block being rotated within the housing A. This means includes, generally, shoes or slippers F on the outer ends of the plungers C, and an eccentric G mounted in the housing A and forming a part or bearing on which the slippers F operate.

In the construction illustrated the housing A includes, generally, an annular body 10, ends 11 and 12 closing the two ends of the body, and mounting brackets 13 on the parts just referred to. In the construction shown the end 11 is integral with the body 10 while the end 12 is detachable from the body, being secured thereto by cap screws 14. The shaft D is mounted in the housing substantially concentric with the body 10 being carried in bearings 15 in the ends 11 and 12. The shaft D has a part projecting from one end of the casing so that it can be engaged for purpose of operation or drive.

The cylinder block B is fixed, for instance, keyed, on the shaft D so that it is within the body of the housing between the ends 11 and 12. The block is formed with a plurality of radially disposed cylinders 16 and has a central or hub extension 17 carrying the valve means E.

The valve means E operates to control the flow of fluid from an inlet port 20 to the cylinders 16 and from the cylinders 16 to an outlet port 21. The fluid is admitted from the port 20 to the cylinders through inlet valves 22 and escapes from the cylinders to the port 21 through exhaust or outlet valves 23. In the construction shown the outlet port 21 is formed in one end of the shaft D. The two valves 22 and 23 for each cylinder are located at the hub extension 17 of the cylinder block and are connected with the cylinder by a port 24.

The plungers C slidably fit the cylinders 16 of the block B and project outwardly beyond the block. In the drawing I illustrate packing means 30 around the plungers C to establish fluid-tight connections between the plungers and cylinders.

The eccentric G is carried in the casing A and has an annular internal bearing 31 on which the slippers F operate. The eccentric may be fixed in the casing A, that is, it may be permanently located in the casing A with its eccentric bearing 31 in a definite eccentric position with reference to the axis of the cylinder block B, or it may be mounted so that the eccentricity of the bearing 31, with reference to the axis of the block B, may be varied. In the case illustrated I have shown an arrangement in which the eccentric is mounted for adjustability or variation. In this case the eccentric is held at two diametrically opposite points, being held at one side by a pivot pin 44 and at the other side by an adjusting means including a stem 50 rotatably carried by the body 10 of the housing, a screw 52 on the inner end of the stem, a block 53 threaded on the screw, and a link 54 connecting the block 53 and a lug 56 projecting from the eccentric at a point diametrically opposite the pivot pin 44. The outer end of the stem 50 projects from the casing and carries an operating handle 55.

With the construction just described, the handle 55 can be operated so that the block 53 is moved along the screw causing the eccentric to be swung about the pivot pin 44, thus shifting the relation of the internal annular bearing 31 of the eccentric with reference to the axis of the block B. In accordance with the preferred form of the invention, the eccentric bearing 31 is truly circular and is made as wide as the casing A will allow. As will be seen from the drawing, the eccentric G is an annular member fitting the body 10 of the casing with sufficient clearance to allow it to be adjusted as above described and extending between the ends 11 and 12 of the casing so that it is braced from or has bearing engagement on the ends of the casing.

The bearing shoes or slippers F are carried on the outer ends of the plungers C so that they can tilt or accommodate themselves to the eccentric bearing 31 and are provided with bearing faces 33 which fit the contour of the bearing 31.

Each slipper F is preferably mounted on an axis parallel with that of the eccentric G and cylinder block B. In the construction illustrated the slipper is provided with spaced lugs 35 which carry a pivot pin 34 attached to the outer end of the plunger C. The pivot pin is secured to the outer end of the plunger so that it is transverse of the plunger and is carried in the lugs 35 of the shoe so that it is free to rotate. In practice any suitable means of connection may be provided between the plunger and pivot pin 34. For instance, the plunger may have an extension 36 on its outer end supported in an opening 37 formed in the pin. In the preferred construction the shoe is formed with a bearing or seat 38 for the pin 34 between the lugs 35. With this construction the pin 34 is supported throughout its length and does not bridge between the lugs 35 in a manner to spring when under strain.

The slipper F extends around the bearing 31 in both directions from the point of connection between the slipper and the plunger, the forwardly extending or toe portion 39 of the slipper being longer than the rear or heel portion 40. This is an important feature of the present invention as I have found from practical operation that this effectively compensates for the pivotal friction between the slipper and plunger that would otherwise cause the toe portion to bear against the bearing 31 in a manner to prevent proper formation of the oil wedge depended upon as a bearing between the slipper F and bearing 31. The forward end portion 41 of the toe 39 is rounded or shaped so that it tends to direct oil under the slipper, and the forward portion of the bearing surface 33 of the slipper is provided with grooves 42 which operate to admit oil under the slipper so that it forms an effective bearing wedge. The oil feeding grooves 42, combined with the proportioning of the toe and heel portions of the slipper, result in effective formation of an oil film or wedge between the slipper and eccentric bearing as the device operates.

The oil film established as above described is effective in providing a highly efficient bearing or sliding engagement between the slippers and eccentric and in providing an engagement of this kind which will operate at very high pressures, making the mechanism capable of operation under conditions that ordinary devices of this type cannot withstand. As a further means of lubrication for the parts just described, I may provide a lubrication opening 60 from the bearing surfaces 33 of the shoe F to the bearing between the pivot pin 34 and the shoe. In the drawing I have shown a single opening 60 in each shoe connecting the bearing face of the shoe with the pin seat 38 provided in the shoe between the lugs 35.

From the foregoing description it will be apparent that the present invention has provided improvements which provide a simplified, efficient mechanism of the type mentioned. It is to be particularly noted that the invention has, by or through simple and inexpensive mechanical or structural changes, so changed the action of the mechanisms heretofore provided as to make mechanisms of this general type highly efficient and useful in fields in which they have heretofore been inoperative or impractical.

In the foregoing description of the present invention and in the drawing I have illustrated various inventions other than the inventions to which this particular application is directed; for instance, I have illustrated a valve means that is the subject of my co-pending application entitled Valve means for pump, or the like, filed Feb. 26, 1929, Serial No. 342,704, and I have also shown a general construction and arrangement of parts which is the subject of my co-pending application entitled Rotary mechanism, filed Feb. 25, 1929, Serial No. 342,602.

Having described only a typical preferred form of my invention, I do not wish to limit myself to the specific details set forth, but wish to reserve to myself any changes or variations that may appear to those skilled in the art or fall within the scope of the following claims:

Having described my invention, I claim:

1. A connection between a shoe for engaging an internal bearing and a part rotating relative to the bearing, said connection including spaced lugs on the inner side of the shoe, there being a concave seat in the shoe between the lugs, and a cylindrical pin extending between and pivotally carried by the lugs to be in engagement with the seat there being an opening in the pin between the lugs, and a connection between the pin and said part including a reduced portion on the part supported in the opening, the opening extending to the seat to form a lubricant chamber at the seat.

2. In a mechanism having an internal bearing and a part rotating relative to the bearing, a shoe for engaging the bearing, and a connection between the shoe and said part including spaced lugs on the inner side of the shoe, there being a concave seat in the shoe between the lugs, a cylindrical pin pivotally carried by the lugs so as to be in operative engagement with the seat, there being a socket in the pin at a point between the lugs, and a connection between the said part and the pin including a reduced extension on said part supported in the socket and providing a shoulder seating outwardly against the pin.

3. A mechanism having an internal bearing, a rotatable cylinder block in the bearing, a reciprocable plunger carried by the cylinder block, and a shoe for engaging the bearing, characterized by a connection between the shoe and the plunger, including spaced lugs on the back of the shoe, there being a concave seat on the back of the shoe having a center of curvature parallel to the axis of rotation of the cylinder block, a cylindrical pin extending between and pivotally carried by the lugs to be in operative engagement with the seat, there being a transverse socket in the pin, and a reduced extension on the plunger supported in the socket.

HARRY F. VICKERS.